(12) United States Patent
Lau et al.

(10) Patent No.: US 9,793,790 B2
(45) Date of Patent: Oct. 17, 2017

(54) ADAPTIVE OPEN-LOAD OVERVOLTAGE CONTROL METHOD AND CIRCUIT

(71) Applicant: Infineon Technologies Austria AG, Villach (AT)

(72) Inventors: Tiam Poh Lau, Singapore (SG); Marcus Schaemann, Munich (DE)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 14/951,166

(22) Filed: Nov. 24, 2015

(65) Prior Publication Data
US 2017/0149325 A1 May 25, 2017

(51) Int. Cl.
*H02M 3/335* (2006.01)
*H02M 1/32* (2007.01)
*H05B 33/08* (2006.01)

(52) U.S. Cl.
CPC .......... *H02M 1/32* (2013.01); *H02M 3/33507* (2013.01); *H05B 33/0815* (2013.01)

(58) Field of Classification Search
CPC ..... H02M 3/33507; H02M 2001/0009; H02M 3/33523; H02M 2001/0054; Y02B 70/1491; H02H 7/1213
USPC ... 363/20, 21.05, 21.07, 21.08, 21.11–21.18, 363/37, 56.01, 56.05, 56.11; 361/18, 361/91.1, 93.1, 93.4, 94, 41
See application file for complete search history.

(56) References Cited

U.S. PATENT DOCUMENTS

| | | | | | |
|---|---|---|---|---|---|
| 5,029,269 | A | * | 7/1991 | Elliott | .................... H02H 3/025 323/284 |
| 5,687,066 | A | * | 11/1997 | Cook, II | ............... H02H 7/1257 361/91.6 |
| 6,049,471 | A | * | 4/2000 | Korcharz | .......... H02M 3/33515 363/20 |

(Continued)

OTHER PUBLICATIONS

"Household and similar electrical appliances—Safety", British Standard, BS EN 60335-1:2002, 2005.

(Continued)

*Primary Examiner* — Rajnikant Patel
(74) *Attorney, Agent, or Firm* — Murphy, Bilak & Homiller, PLLC

(57) ABSTRACT

An overvoltage protection circuit and a method for protecting against an output from a power supply reaching overvoltage levels is provided. The overvoltage protection provides two operational modes for the power supply. In both modes, the overvoltage protection monitors the output voltage of the power supply and disables it if the output voltage reaches a threshold indicating an overvoltage event. In normal operation, this threshold is set to a level that is higher than a nominal safety threshold defined for the power supply whereas in reduced operation, this threshold is set to a value lower than the safety threshold. When an overvoltage event is detected in normal operation, the overvoltage protection transitions the power supply into the reduced operational mode before reactivating it. The power supply may be reactivated, produce an overvoltage event, and be deactivated multiple times in the reduced operational mode. Normal operation may resume if the power supply has no overvoltage events for a predetermined time period.

20 Claims, 6 Drawing Sheets

(56) References Cited

U.S. PATENT DOCUMENTS

| | | | |
|---|---|---|---|
| 7,254,000 B1* | 8/2007 | Smith | H02H 7/1213 |
| | | | 323/224 |
| 7,902,794 B2* | 3/2011 | Ahmad | H02J 7/0031 |
| | | | 320/128 |
| 2014/0198540 A1* | 7/2014 | Xu | H02M 3/33523 |
| | | | 363/21.12 |
| 2015/0137786 A1* | 5/2015 | Maddali | H02H 7/065 |
| | | | 323/284 |

OTHER PUBLICATIONS

"Protection against electric shock—Common aspects for installation and equipment", International Standard, IEC 61140, Third Edition 2001.

* cited by examiner ate overvoltage control method and circuit

TECHNICAL FIELD

The present application relates to an overvoltage protection circuit and a method for protecting against an output from a power supply reaching overvoltage levels. The circuits and methods disclosed herein are particularly applicable for drivers used to supply power to light emitting diodes (LEDs).

BACKGROUND

Consumer electrical devices are typically required to be certified against electrical safety standards. The appropriate safety standards vary according to the type of device and adherence to the safety standards is often specified by national regulations. Commonly-required safety certifications for devices using direct current (DC) power specify that the device output voltage(s) remain below a Safety Extra Low Voltage (SELV) level. The requirements for SELV systems are specified in standards such as International Electrotechnical Commission (IEC) 61140 and European Standard (EN) 60335-1. The IEC defines a SELV system as a system in which a DC output voltage cannot generally exceed 60 volts, although limited excursions above this voltage level may be permitted for brief periods.

Lighting circuits typically must meet the requirements of a SELV system. This presents potential problems with light emitting diode (LED) lighting systems, as the power supplies for these systems must often provide voltages close to the 60 volt limit of a SELV-compliant system. For example, the LEDs in such a lighting system may require that an LED driver provide constant current at up to 54 volts, nominally, for proper operation. Due to component tolerances within the lighting system circuit and its driver, variances due to environmental factors (e.g., temperature), etc., a voltage somewhat higher than the nominal 54 volt level may be produced, e.g., 57 volts. This leaves very little margin between the power supply output voltage and the allowed voltage limit of 60 volts, at which level an overvoltage protection circuit needs to disable the output power. A power supply providing an output of 57 volts under normal operation with an LED load is likely to provide a voltage exceeding the 60 volt limit if the LED load is removed or if some other fault condition occurs. Techniques for protecting against such overvoltage events tend to have disadvantages such as higher circuit cost or poor performance.

One technique for accurately protecting against such overvoltage events is to incorporate an overvoltage detection circuit on the secondary side of an isolating transformer in a power supply. This detection circuit can incorporate high-accuracy components (e.g., low-tolerance Zener diodes) in order to detect overvoltage events with great accuracy. A feedback controller on the secondary side could inform a power supply controller on the primary side that an overvoltage event has been detected and that the power supply needs to be disabled. Alternatively, the overvoltage detection could be performed by the primary-side controller, but this would require the use of an opto-coupler or some similar component. Either of these options has the disadvantage that extra circuit components are required leading to a larger footprint requirement for the circuit and higher circuit costs.

A second technique for protecting against overvoltage events is simply to lower the operating output voltage, e.g., from the 54 volts mentioned earlier to 50 volts. This relaxes the accuracy requirement for the overvoltage protection threshold voltage. For example, a nominal threshold of 55 volts could be used to detect an overvoltage event for a power supply driving a nominal output voltage of 50 volts. Should this threshold voltage be moderately inaccurate due to component tolerances and/or the sensing of the output voltage be moderately inaccurate, the output could be kept safely below the 60 volt SELV limit with considerable confidence. This second technique has the disadvantage that it cannot be used to drive circuits that require constant current at a voltage close to 60 volts.

Yet a third technique takes advantage of the aforementioned exception to the SELV requirements, wherein the output voltage may exceed the 60 volt limit by a small margin (e.g., 5 volts) for a brief period of time (e.g., 200 milliseconds). The threshold for detecting an unsafe voltage is set near the 60 volt limit. Should this threshold be reached, the power supply is disabled. This method has the disadvantage that there is no recovery mechanism. Should an overvoltage event occur, e.g., due to a removed load or some fault, the power supply would remain disabled. This means that "hot-plug" functionality would not be supported, and recovery from an overvoltage event would require that the power supply controller be power-cycled or similar.

A power supply controller and method for protecting against overvoltage events at the output of a power supply is desired. This controller and method should require few or no extra circuit components, should be capable of operating close to an overvoltage protection threshold, and should be capable of recovering when an overvoltage event is triggered.

SUMMARY

According to an embodiment of a method of overvoltage protection, an overvoltage limit for a power supply is set to a first value that is higher than a safety limit defined for the power supply circuit. If the output voltage from the power supply circuit reaches the overvoltage limit, the power supply circuit is deactivated and the overvoltage limit is reduced to a second value that is lower than the safety limit. Subsequently, the power supply circuit is reactivated after, typically, waiting for a timeout period. For each occurrence of the output voltage of the power supply circuit reaching the second value of the overvoltage limit, the power supply circuit is again deactivated.

According to an embodiment of a power supply circuit, the power supply circuit is configured to provide power to a load and to provide overvoltage protection at an output of the power supply. The power supply circuit is comprised of a voltage source and a controller configured to control the voltage and current output from the power supply. The controller includes an overvoltage protection circuit that is configured to set an overvoltage limit for the power supply circuit to a first value that is higher than a safety limit defined for the power supply circuit. When the overvoltage protection circuit detects that an output voltage of the power supply circuit reaches the overvoltage limit, it changes the overvoltage limit to a second value that is lower than the safety limit and deactivates the power supply circuit. Next, the power supply circuit is reactivated with this reduced overvoltage limit, typically after waiting for a time period. When the overvoltage protection circuit detects that the output voltage of the power supply circuit reaches the second value of the overvoltage limit, the power supply is again deactivated.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Embodiments described herein provide for overvoltage protection at the output of a power supply, as might be used to drive an LED lighting system. The overvoltage protection is implemented without adding significant circuit components beyond those typically needed for a conventional power supply and an associated controller. Further, this overvoltage protection allows the power supply to provide a voltage output, under normal conditions, that is close to a safety limit. Yet further, the power supply circuit and controller associated with the overvoltage protection are capable of recovering from an overvoltage event at the power supply output after normal operation resumes, e.g., after a load is reconnected or a fault condition at the power supply output is removed.

Figure 1:
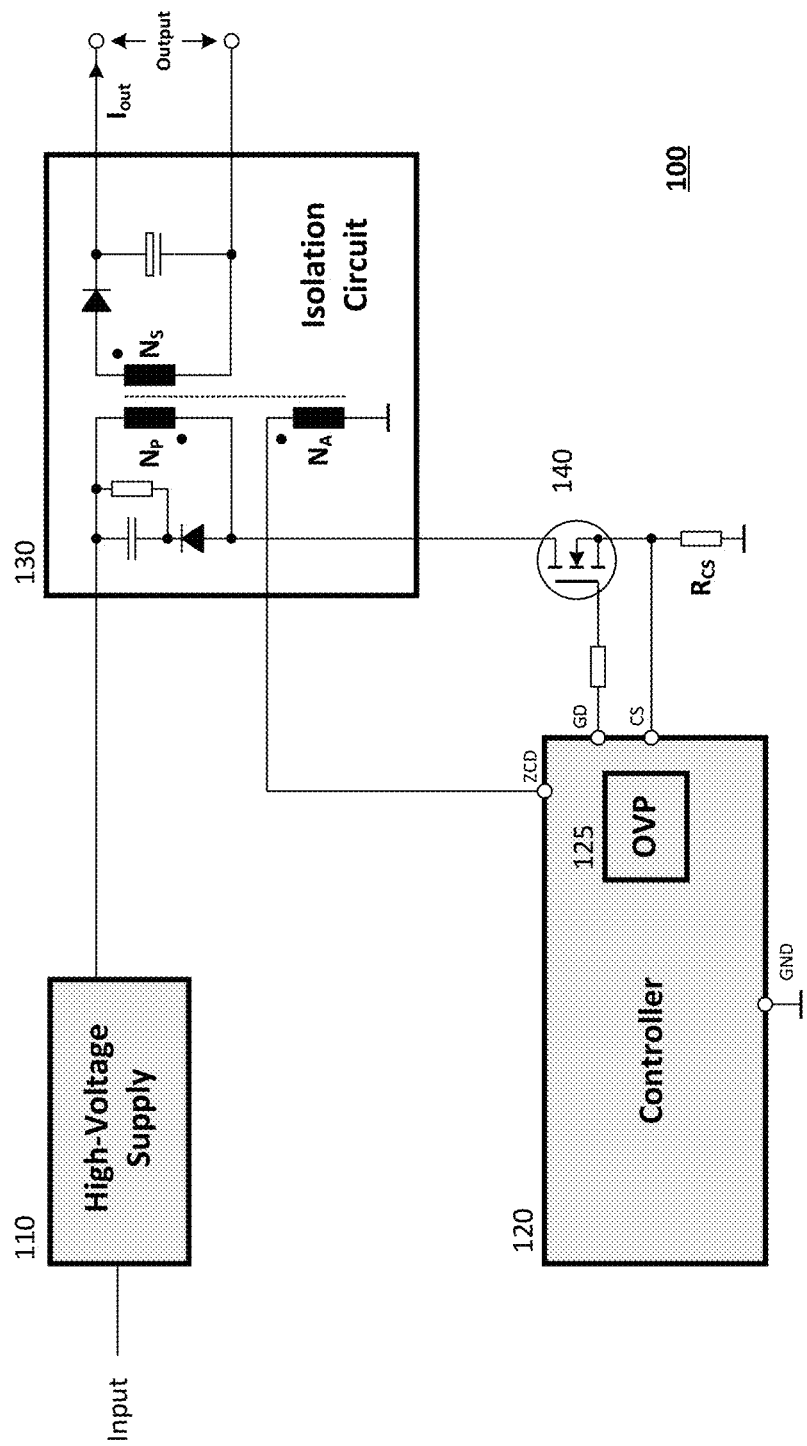
FIG. 1 illustrates a power supply circuit including a power supply controller with an overvoltage protection circuit.

FIG. 1 illustrates a power supply circuit 100 as might be used to supply power to an LED lighting system. A high-voltage supply 110 provides direct-current (DC) power within the power supply circuit 100. The high-voltage supply 110 may include a transformer and rectification circuitry to convert an alternating current (AC) input power into DC high-voltage power. The high-voltage supply 110 provides an input to an isolation circuit 130 that serves to separate any high-voltage power from the output voltage used to drive a load, e.g., a string of LED lights. As illustrated in FIG. 1, the isolation circuit 130 includes a primary side wherein high-voltage may be applied, a secondary side that provides output voltage to a load, and an auxiliary winding that may be used to detect the output voltage based on power reflected from the secondary side. The isolation circuit 130 may include a transformer, a set of inductors arranged to transfer power, or some other topology for transferring power. The output voltage is subject to a voltage safety limit such as the 60 volt limit nominally required by SELV systems. The amount of power supplied to the isolation circuit 130 is controlled using pulse-width modulation (PWM) implemented using a switch 140. The switch 140 may be a metal-oxide semiconductor field-effect transistor (MOSFET), an insulated gate bipolar transistor (IGBT), or some other type of power switch.

The switch 140 is controlled using a gate driver (GD) signal output from a power supply controller 120. In the controller 120 illustrated in FIG. 1, current is sensed at an input CS and voltage is sensed at an input ZCD. The sensed current and voltage are used to generate an appropriate gate driver signal for controlling switch 140 and, ultimately, provide a target output voltage from isolation circuit 130.

The power supply controller 120 may be implemented as a digital controller or as an analog controller. When implemented as a digital controller, power supply controller 120 is comprised of one or more processing circuits, memory, timer circuits, and other specialized digital circuitry. When implemented as an analog controller, power supply controller 120 is comprised of, for example, multiplexors, comparators, and timers. The controller may also be implemented using a mixture of analog and digital components. Regardless of whether controller 120 is implemented using analog, digital or a combination of analog and digital circuits, the controller 120 is configured to implement the methods described below. Power supply controller 120 includes an overvoltage protection (OVP) circuit 125 that is configured to implement techniques for protecting against overvoltage events at the power supply output.

Note that certain components of the power supply circuit 100 are not described in great detail above, as these components are well-known in the art and their detailed description would obscure the unique aspects of the invention. For example, the high-voltage supply 110 and the isolation circuit 130 are well-known components implemented using conventional circuitry. Note, also, that alternative implementations could omit these components. For example, the power supply might accept a lower-voltage DC input directly (thereby requiring no AC-to-DC conversion) meaning that there is no high-voltage supply. Additionally, there may be no need for an isolation circuit if the internal voltage of the power supply is kept sufficiently low or if a non-isolated power supply topology is preferred, e.g., as in a buck converter. It is also possible that the power supply output voltage is controlled by means other than a PWM signal. The unique aspects of the overvoltage protection are implemented within the power supply controller 120 and its OVP circuit 125. The associated techniques are described below for several embodiments of a method, as might be implemented in OVP circuit 125, and, subsequently, for a power supply circuit 100 that includes an OVP circuit 125.

Figure 2:
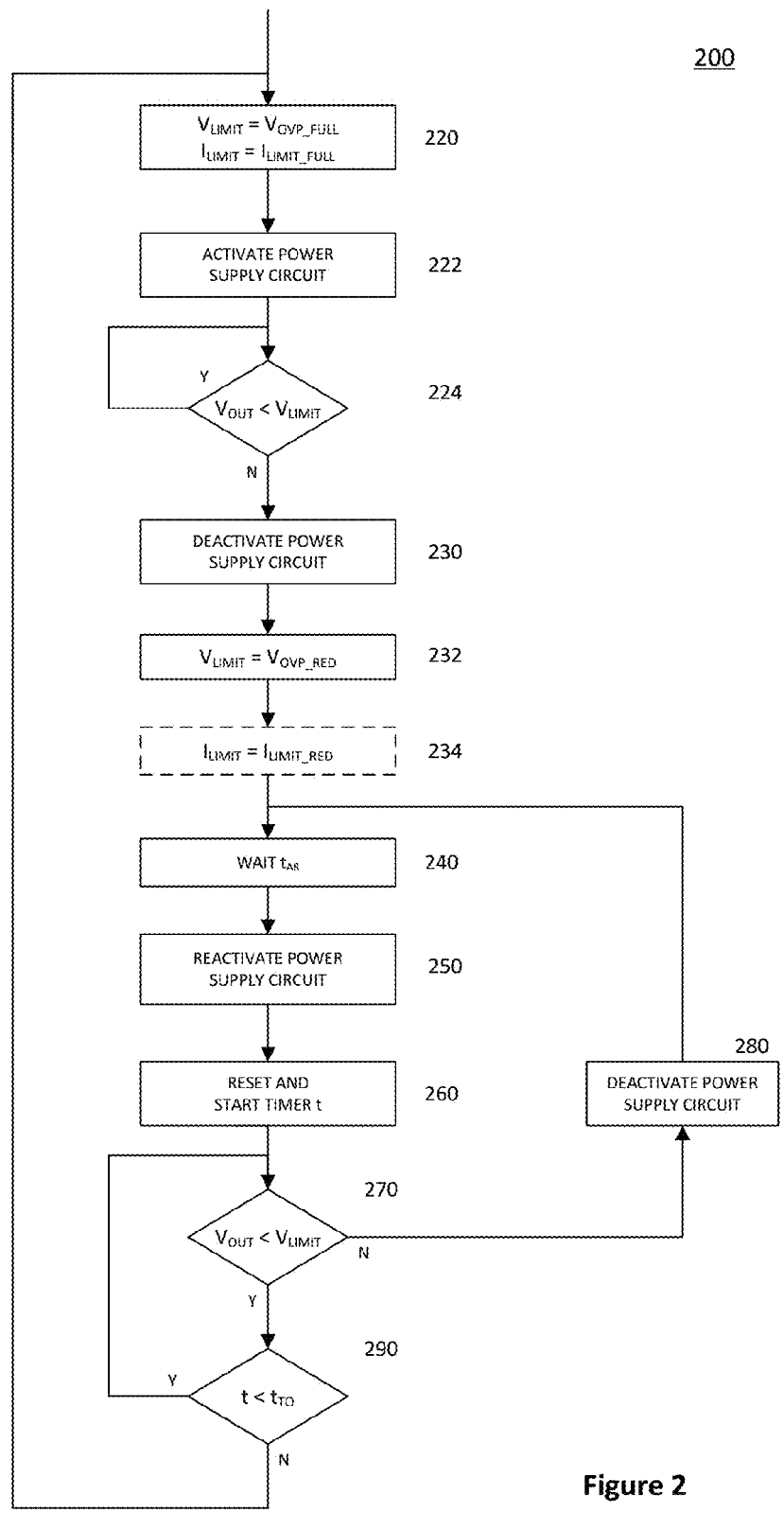
FIG. 2 illustrates a method for implementing overvoltage protection for a power supply circuit.

FIG. 2 illustrates a first embodiment that is directed to a method for implementing overvoltage protection at the output of a power supply. Such a method may be implemented within an OVP circuit 125 such as that illustrated in FIG. 1. The power supply output voltage ($V_{OUT}$) should generally be kept below a voltage safety limit, $V_{SAFETY\_LIMIT}$. However, the output voltage may exceed the voltage safety limit by a small amount for brief periods of time. The method takes advantage of this exception by allowing the output voltage to make an isolated excursion up to an OVP voltage limit $V_{OVP\_FULL}$ that is higher than the safety limit $V_{SAFETY\_LIMIT}$. If the output voltage reaches or exceeds the voltage limit $V_{OVP\_FULL}$, the OVP circuit deactivates the power supply, optionally waits for a time period or until some other criteria are met, and then reactivates the power supply in a safety mode wherein a reduced OVP voltage limit is used and, optionally, the maximum current output of the power supply is reduced.

The method 200 of FIG. 2 begins by setting a voltage threshold $V_{LIMIT}$ to an OVP voltage limit $V_{OVP\_FULL}$ that is higher than the safety limit $V_{SAFETY\_LIMIT}$, and by setting the maximum output current ($I_{LIMIT}$) from the power supply to a full current ($I_{LIMIT\_FULL}$) 220 that might be necessary to drive the targeted load for proper operation. Next, the power supply circuit is activated 222. A voltage $V_{OUT}$ corresponding to the output voltage of the power supply is then monitored 224. If it is detected that the output voltage $V_{OUT}$ reaches the voltage threshold $V_{LIMIT}$, the power supply voltage is deactivated 230. The voltage threshold $V_{LIMIT}$ is then set to a reduced OVP voltage limit $V_{OVP\_RED}$ 232 that is lower than the safety limit $V_{SAFETY\_LIMIT}$. In conjunction with this, the maximum allowed current $I_{LIMIT}$ is reduced to a value $I_{LIMIT\_RED}$ 234. (This is shown in FIG. 2 within a dotted box as this step is optional.) After waiting for an auto-restart time period $t_{AR}$ 240, the power supply circuit is reactivated 250. In conjunction with this reactivation, a timer t is reset and started 260. The voltage $V_{OUT}$ corresponding to the output voltage of the power supply is again monitored 270, but with the voltage threshold $V_{LIMIT}$ now set to the reduced OVP voltage limit $V_{OVP\_RED}$. If it is detected that the output voltage $V_{OUT}$ reaches the voltage threshold $V_{LIMIT}$, the power supply circuit is deactivated 280, and control is returned to the step 240 of waiting for the auto-restart time period $t_{AR}$. Should the output voltage $V_{OUT}$ remain below the voltage threshold $V_{LIMIT}$ for a timeout period $t_{TO}$, as determined by the timer test $t<t_{TO}$ 290, then it may be presumed that the missing load or other fault condition that led to the initial overvoltage event has been corrected. In this case, the power supply circuit is restored to its full operational mode by returning to the beginning of the method where the voltage threshold $V_{LIMIT}$ is set back to the OVP voltage limit $V_{OVP\_FULL}$ and the maximum output current ($I_{LIMIT}$) for the power supply is set back to its full level $I_{LIMIT\_FULL}$ 220.

Figure 3:
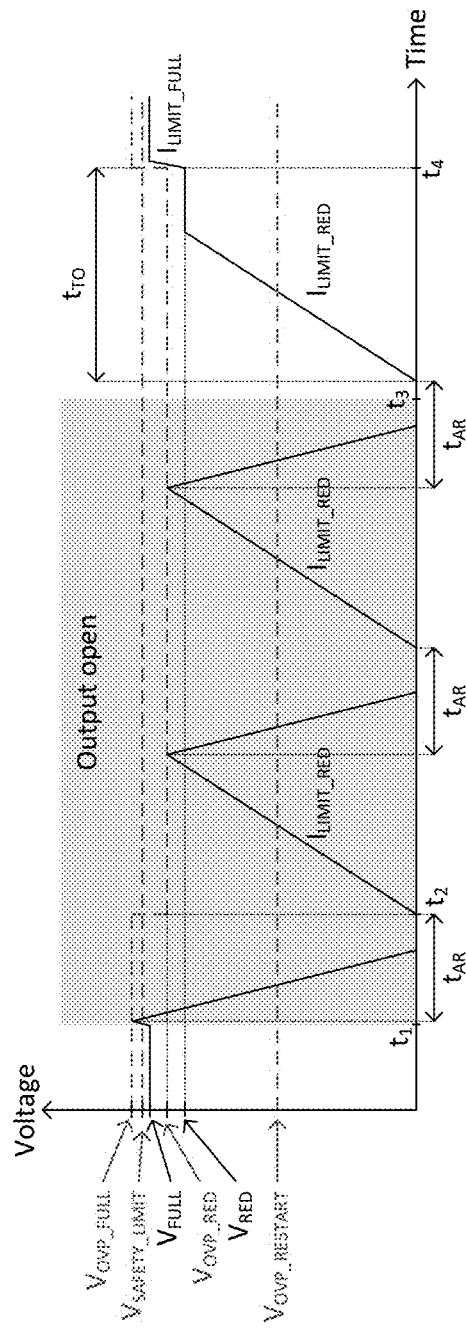
FIG. 3 illustrates a voltage waveform produced by a power supply circuit controlled such that it implements overvoltage protection according to a first embodiment.

FIG. 3 illustrates an exemplary voltage output waveform as may be produced by the method of the first embodiment. At the beginning of this waveform, a power supply circuit is producing an output voltage $V_{FULL}$. At time $t_1$, the load being driven by the power supply circuit is removed leading to an open-circuited output. As shown in the waveform, this causes the output voltage to rise above the safety voltage limit $V_{SAFETY\_LIMIT}$ and to reach OVP voltage limit $V_{OVP\_FULL}$. In response to detecting this event, the OVP circuit deactivates the power supply circuit, in preparation for reactivating the power supply circuit in a safety mode of operation. Deactivation of the power supply circuit leads to the output voltage being discharged, e.g., by a bleeder circuit.

After the output voltage is sufficiently discharged and after an auto-restart time period $t_{AR}$, the power supply circuit is reactivated at time $t_2$, but with a maximum current output ($I_{LIMIT\_RED}$) that is reduced relative to the maximum current output in normal operation ($I_{LIMIT\_FULL}$). The output voltage increases until it reaches the voltage limit $V_{OVP\_RED}$, at which time the power supply circuit is again deactivated for a period of time shown as $t_{AR}$. (The time periods after the initial power supply deactivation and subsequent deactivations are shown as the same in FIG. 3 but may be different.) The process of reactivating the power supply circuit, reaching the output voltage limit $V_{OVP\_RED}$ and deactivating the power supply circuit is repeated again.

At time $t_3$, a power supply load is applied and serves to limit the output voltage of the power supply. Hence, the power supply circuit, now operating with the reduced current $I_{LIMIT\_RED}$ produces an output voltage that remains below the limit $V_{OVP\_RED}$ after it is reactivated. If the voltage output from the power supply remains below the limit $V_{OVP\_RED}$ for a timeout period $t_{TO}$ after reactivation, it may be presumed that the fault condition is removed and that the power supply may resume normal operation. Hence, at time $t_4$, the maximum allowed current is increased to its normal value ($I_{LIMIT\_FULL}$) and the voltage limit for detecting fault conditions at the voltage output of the power supply is raised to its normal operational value ($V_{OVP\_FULL}$). With the power supply restored to its normal operating state, its voltage output increases to its normal value of $V_{FULL}$, as it was before the fault condition occurred.

A second embodiment that is also directed to a method will now be described. This embodiment is similar to that described above, but differs regarding the criteria under which the power supply circuit is reactivated. This second embodiment is described in conjunction with the waveform illustrated of FIG. 4. This method may also be implemented within an OVP circuit 125 such as that illustrated in FIG. 1.

Figure 4:
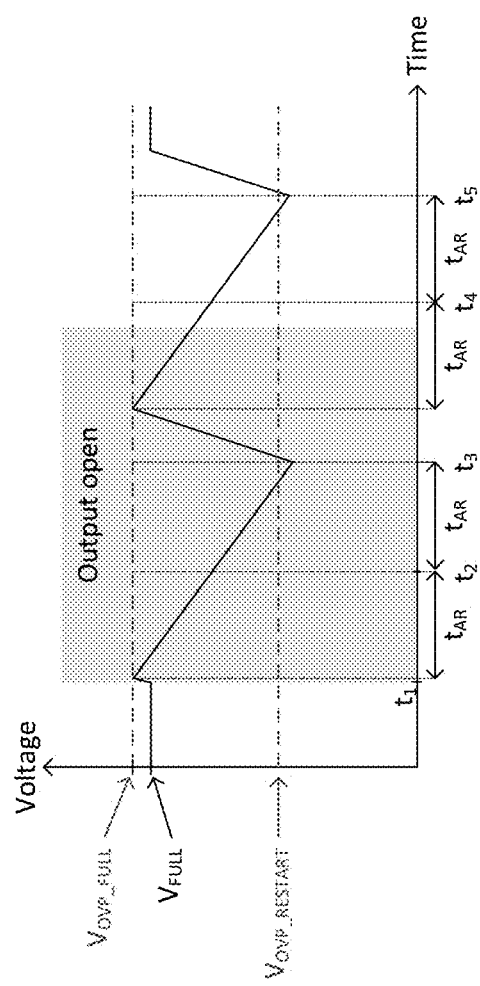
FIG. 4 illustrates a voltage waveform produced by a power supply circuit controlled such that it implements an overvoltage protection according to another embodiment.

Whereas the method of the first embodiment shows that the power supply circuit is reactivated in its safe mode after an auto-restart time period $t_{AR}$ 240, the second embodiment includes an additional criterion before allowing reactivation of the power supply. More particularly, the reactivation only occurs if the voltage output from the power supply circuit is below a threshold $V_{OVP\_RESTART}$. FIG. 4 illustrates an output voltage waveform as may be produced by a power supply circuit implemented according to this second embodiment. The method of the second embodiment is the same as that of the first embodiment until time $t_2$. At this time, as shown in FIG. 4, the output voltage has not discharged sufficiently and is still higher than the threshold $V_{OVP\_RESTART}$. For this reason, the power supply circuit is not yet reactivated. The output voltage is checked again at time $t_3$ and found to have discharged to a level below the threshold $V_{OVP\_RESTART}$. In response to detecting this, the power supply circuit is reactivated in its safe mode (i.e., with reduced current and a reduced OVP voltage limit), e.g., as previously explained herein in connection with steps 250 through 260 in FIG. 2. The remaining operation of the method in this second embodiment is the same as that of the method described above in the first embodiment.

While FIG. 4 illustrates a case in which the voltage output is detected after an auto-restart period ($t_{AR}$) and multiples thereof, the voltage output could be monitored constantly in order to detect when the voltage output discharges to the $V_{OVP\_RESTART}$ level. Upon detecting this condition, the power supply circuit is reactivated in its safe mode, regardless of whether the time period $t_{AR}$ has elapsed or not.

In conjunction with the second embodiment described above, the voltage level $V_{OVP\_RESTART}$ may be used to disable the power supply indefinitely. If the output voltage has not discharged below $V_{OVP\_RESTART}$ after a predetermined time period, which will generally be considerably greater than the time period $t_{AR}$, it may be presumed that there is a fault in the discharge (e.g., bleeder circuit) and that there is no reason to continue attempting to restart the power supply. Hence, if the output voltage remains above $V_{OVP\_RESTART}$ for this predetermined time period, attempts to reactivate the power supply are suspended indefinitely.

Figure 5:
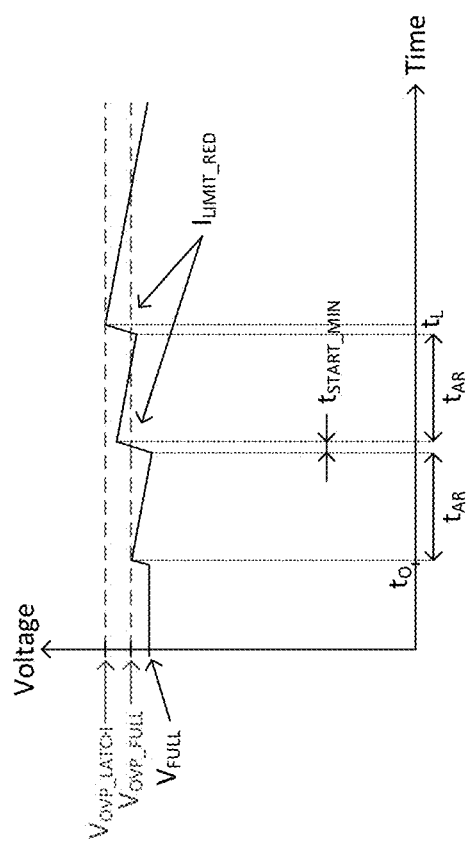
FIG. 5 illustrates a voltage waveform produced by a power supply circuit controlled such that the overvoltage protection is implemented according to yet another embodiment.

FIG. 5 illustrates an exemplary waveform of a power supply output voltage according to a third embodiment that is also directed to a method. This embodiment may be combined with the first embodiment and may also be implemented within an OVP circuit 125 such as that illustrated in FIG. 1. This third embodiment is principally directed to addressing the situation in which the output voltage from the power supply circuit does not discharge adequately when the power supply circuit is deactivated. This may occur, e.g., when a bleeder circuit is open or otherwise faulty. This is considered a more serious fault than the removed load described in the first embodiment and, as a result, the recovery methods described in the earlier embodiments are not desirable for such a fault.

The waveform illustrated in FIG. 5 begins with an output voltage $V_{FULL}$ as might be produced when the power supply circuit, and an associated load, are operating under normal conditions. At time $t_0$, a fault condition (such as the removal of the power supply load) occurs causing a spike in the voltage. Upon the output voltage reaching the limit $V_{OVP\_FULL}$, the power supply circuit is deactivated. After a time period $t_{AR}$, the power supply circuit is reactivated in its safe mode, i.e., with reduced maximum current and a reduced overvoltage protection limit. Due to practical switching constraints, the power supply circuit must be activated for at least a minimum time period, shown as $t_{START\_MIN}$, in FIG. 5. After this time period, it is detected that the output voltage is above the limit $V_{OVP\_FULL}$ (and $V_{OVP\_RED}$) and, therefore, the power supply circuit is again deactivated. The process of waiting $t_{AR}$, and reactivating the power supply circuit for $t_{START\_MIN}$ is repeated. At time $t_L$, the output voltage has reached a voltage limit $V_{OVP\_LATCH}$, which is higher than the voltage limit $V_{OVP\_FULL}$. Upon detecting that the output voltage has reached the limit $V_{OVP\_LATCH}$, further attempts to reactivate the power supply are suspended indefinitely. For this case, there is no recovery from the overvoltage event(s), at least not without resetting the system.

Figure 6:
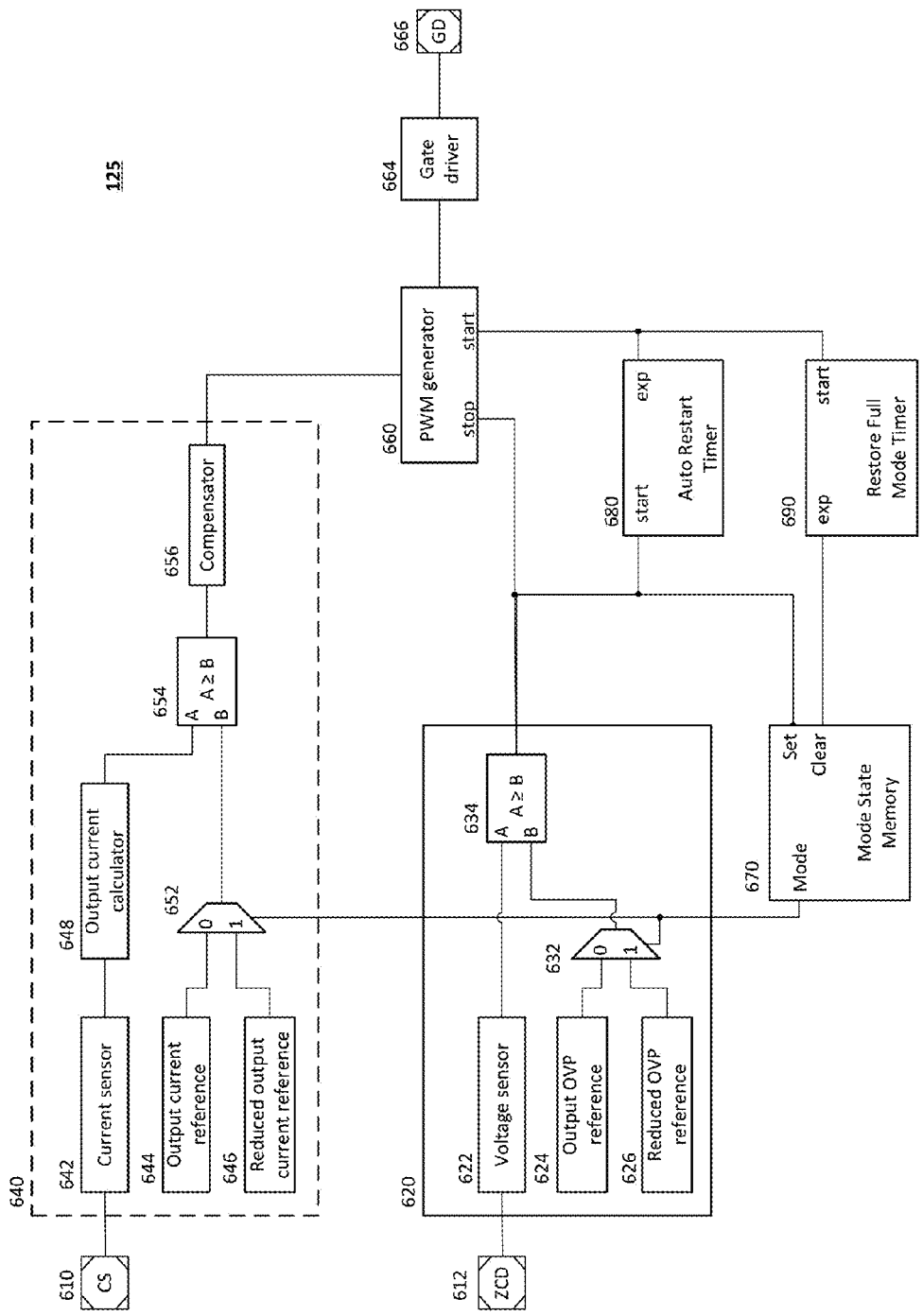
FIG. 6 illustrates a block diagram of an overvoltage protection circuit for implementing overvoltage protection within a power supply controller.

As explained previously, the method embodiments described above may be implemented in a power supply controller 120 and, more particularly, in an overvoltage protection (OVP) circuit 125. The techniques disclosed above will now be described in the context of FIG. 6, which illustrates components from an OVP circuit 125. The OVP circuit 125 includes an overvoltage detection circuit 620, a current-limiting circuit 640, a PWM generator 660, a gate driver 664, state memory, and timers. These components will be described in further detail below.

The overvoltage detection circuit 620 generates a signal that deactivates the power supply circuit when an overvoltage event is detected. Input ZCD 612 provides a voltage corresponding to the output voltage (e.g., $V_{OUT}$) of the power supply. Note that this voltage may be sensed from a primary, a secondary, or an auxiliary side of an isolation circuit 130, and that the voltage input at ZCD 620 does not need to be equivalent to the final output voltage of the power supply; it merely needs to be indicative of (correspond to) the actual output voltage. Voltage sensor 622 accepts the input ZCD 612, translates it if necessary to a value appropriate for comparing against the OVP protection thresholds, and provides a voltage value to comparator 634.

An overvoltage protection threshold $V_{LIMIT}$ is determined based on the operational mode of the power supply, e.g., full-operational mode or reduced-operational mode. In normal (full-operational) mode, an output OVP reference voltage 624 (e.g., $V_{OVP\_FULL}$) is used whereas in reduced-operational mode, a reduced OVP reference voltage 626 (e.g., $V_{OVP\_RED}$) is used. A multiplexor 632 determines which of these reference voltages to choose as the threshold $V_{LIMIT}$ based on an input signal that indicates the operational mode of the power supply circuit.

A comparator 634 accepts as input a value from voltage sensor 622 corresponding to the voltage output of the power supply, and the OVP protection threshold $V_{LIMIT}$. Responsive to determining that the output voltage exceeds (or reaches) the OVP protection threshold $V_{LIMIT}$, the comparator generates a signal indicating that an overvoltage event has occurred. This signal is provided to the PWM generator 660, auto restart timer 680, and mode state memory 670.

The PWM generator 660 provides a pulse-width modulated voltage waveform that controls the output voltage of the power supply based upon PWM parameters such as switching frequency and duty cycle. The signal generated by the PWM generator 660 is provided to a gate driver 664 which drives an output GD 666. When the comparator 634 generates the signal that indicates that an overvoltage event has occurred, this signal is input to the PWM generator 660 at its 'stop' input. Subsequently, the PWM generator 660 ceases to output a voltage waveform which, in turn, leads to a deactivation of the power supply circuit. The PWM generator 660 also has a 'start' input that is used to activate or reactivate the power supply circuit, as may be commanded from auto restart timer 680. The PWM generator may default to an active state upon power-up, or other elements (not shown) of the controller 120 may provide an activation signal to the 'start' input.

The generated signal indicating that an overvoltage event occurred is also input to mode state memory 670 at its 'set' input. This causes the mode state to change to "reduced" operational mode, as indicated at its 'mode' output. The mode output is used to drive multiplexor 632 so that it uses the reduced OVP reference (e.g., $V_{OVP\_RED}$) as its OVP protection threshold $V_{LIMIT}$ (for when the power supply circuit is reactivated). In an embodiment in which a reduced maximum allowed current is used in "reduced" operational mode, the mode signal is also provided to current-limiting circuit 640. Mode state memory 670 remains in the "reduced" operational state until a signal is applied at its 'clear' input, at which point the 'mode' output is changed so that it indicates normal (full) operational mode for the power supply. Note that the mode state memory may be implemented in any conventional memory technology including random-access memory, nonvolatile memory, or a flip-flop.

Reactivation of the power supply circuit is controlled by an auto restart timer 680. This timer is responsible for waiting for a time period $t_{AR}$. The timer 680 is reset and started once an overvoltage event is detected, as indicated at its 'start' input. Once the time period has elapsed, as may be detected by counting from 0 to $t_{AR}$, the timer generates a time expiration signal 'exp.' This signal is input to the PWM generator 660 so that the PWM generator may reactivate the power supply circuit, albeit in the "reduced" operational mode.

Another timer, denoted "restore full mode timer" 690, is used as part of the recovery of full operational mode for the power supply, e.g., as may be desirable when a fault condition is removed. The timer 690 is reset and started whenever the PWM generator is reactivated by the expiration of the auto restart timer 680. Once a timeout period $t_{TO}$ has elapsed, as may be detected by counting from 0 to $t_{TO}$, the restore full mode timer generates its own time expiration signal 'exp.' This expiration signal indicates that the voltage output has not generated an overvoltage event for the time period $t_{TO}$ since the last reactivation and, hence, it is likely that the power supply fault condition is removed so that "full" (normal) operational mode for the power supply may be restored. The expiration signal is provided to the mode state memory 670, at its 'clear' input, so that the mode state may be changed to "full" operational mode.

As described in the first embodiment of a method, it may be desirable to limit the current output from the power supply when it is operating in its "reduced" operational mode, as shown in the optional step of FIG. 2 that sets a current limit $I_{LIMIT}=I_{LIMIT\_RED}$ 234. In the OVP circuit 125, this technique is implemented in the optional current-limiter circuit 640.

Input CS 610 provides a signal corresponding to the output current of the power supply. This current will typically be sensed using a voltage drop on the supply line controlled by switch 140, but other methods may be used. Current sensor 642 may sense the voltage at input CS 610 and convert it to a current. The output from current sensor 642 may be further translated by an output current calculator 648 in order to better correspond to the actual current output from the power supply, e.g., at the secondary side of an isolation circuit 130, or to otherwise put the current in a better form for input to a comparator 654.

A maximum allowed current $I_{LIMIT}$ is determined based on the operational mode of the power supply, e.g., full-operational mode or reduced-operational mode. In normal (full-operational) mode, a maximum allowed current 644 (e.g., $I_{LIMIT\_FULL}$) is used whereas in reduced-operational mode, a reduced maximum allowed current 646 (e.g., $I_{LIMIT\_RED}$) is used. A multiplexor 652 determines which of these reference currents to use as the maximum allowed current $I_{LIMIT}$ based on an input signal (from mode state memory 670) that indicates the operational mode of the power supply circuit.

The comparator 654 accepts as input a value corresponding to the current output of the power supply, from the output current calculator 648, and the maximum allowed current $I_{LIMIT}$ from the multiplexor 652. Responsive to determining that the output current exceeds (or reaches) the maximum allowed current $I_{LIMIT}$, the comparator generates a signal indicating that the output current is excessive. This signal is provided to a compensator 656, which then provides one or more signals to the PWM generator 660 indicating that the current needs to be limited. The compensator 656 may alter the PWM parameters within PWM generator 660 in order to achieve a desired (limited) current level, e.g., by altering the PWM frequency or duty cycle.

OVP circuit 125 has been described above as being comprised of a mixture of discrete analog and digital components. Many of these components, and their associated operation, may instead be implemented using processor circuitry as may be provided by a general-purpose computer, a special-purpose computer, a digital signal processor, a controller, or a combination of processors implementing programmable instructions, stored in memory, that is configured to provide the described operation.

As used herein, the terms "having," "containing," "including," "comprising" and the like are open-ended terms that indicate the presence of stated elements or features, but do not preclude additional elements or features. The articles "a," "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of overvoltage protection, comprising:
    setting an overvoltage limit for a power supply circuit to a first value that is higher than a safety limit defined for the power supply circuit;
    detecting that an output voltage of the power supply circuit reaches the overvoltage limit;
    in response to detecting that the output voltage reaches the overvoltage limit, changing the overvoltage limit to a second value that is lower than the safety limit and deactivating the power supply circuit;
    subsequently reactivating the power supply circuit;
    determining whether the output voltage of the power supply circuit reaches the second value of the overvoltage limit after each occurrence of reactivating the power supply circuit; and
    deactivating the power supply circuit for each occurrence of the output voltage reaching the second value.

2. The method of claim 1, further comprising waiting a first predetermined time period after deactivating the power supply circuit before reactivating the power supply circuit.

3. The method of claim 1, further comprising detecting whether the output voltage has dropped to a third value that is lower than the second value, and reactivating the power supply circuit responsive to detecting that the output voltage has dropped to the third value.

4. The method of claim 1, further comprising:
    changing the overvoltage limit from the second value back to the first value responsive to the output voltage remaining below the second value for a second predetermined time period after reactivating the power supply circuit.

5. The method of claim 1, wherein reactivating the power supply circuit further comprises limiting a current output from the power supply to a second current limit that is lower than a first current limit, wherein the first current limit is used by the power supply circuit during a period when the overvoltage limit for the power supply circuit is set to the first value, and the second limit is used when the overvoltage limit for the power supply circuit is set to the second value.

6. The method of claim 1, wherein the steps of subsequently reactivating, determining, and deactivating are repeated.

7. The method of claim 1, wherein the output voltage of the power supply is discharged using a bleeder circuit during a time period when the power supply is deactivated.

8. The method of claim 1, wherein the output voltage of the power supply circuit is based upon a pulse-width modulated (PWM) waveform.

9. The method of claim 1, additionally comprising:
    in conjunction with the subsequent reactivation of the power supply circuit, determining whether the output voltage is above a fourth value that is higher than the safety limit defined for the power supply circuit; and
    responsive to determining that the output voltage is above the fourth value, aborting subsequent attempts to reactivate the power supply circuit.

10. The method of claim 1, wherein a load powered by the power supply circuit is a light-emitting diode (LED) or a string of LEDs.

11. The method of claim 10, wherein a forward voltage of the LED or string of LEDs corresponds to the output voltage of the power supply circuit, and wherein the forward voltage and current drawn by the LED or string of LEDs is lower when the overvoltage limit for the power supply circuit is set to the second value and higher when the overvoltage limit for the power supply circuit is set to the first value.

12. The method of claim 10, wherein the safety limit defined for the power supply circuit is about 60 volts, the first value is between the safety limit and 62 volts, and the second value is between 54 volts and the safety limit.

13. A method of overvoltage protection, comprising:
setting an overvoltage limit for a power supply circuit to a first value that is higher than a safety limit defined for the power supply circuit;
detecting that an output voltage of the power supply circuit reaches the overvoltage limit;
in response to detecting that the output voltage reaches the overvoltage limit, changing the overvoltage limit to a second value that is lower than the safety limit and deactivating the power supply circuit;
waiting for a first predetermined time period after the deactivation of the power supply circuit, and then determining whether the output voltage of the power supply has discharged to below a third value, the third value being lower than the safety limit;
responsive to determining that the output voltage has discharged to below the third value, reactivating the power supply circuit;
determining whether the output voltage of the power supply circuit reaches the second value of the overvoltage limit after each occurrence of reactivating the power supply circuit; and
deactivating the power supply circuit for each occurrence of the output voltage reaching the second value.

14. A power supply circuit configured to provide power to a load and configured to provide overvoltage protection at an output of the power supply circuit, the power supply circuit comprising a voltage source and a controller configured to control the voltage and current output from the power supply, the controller including an overvoltage protection circuit operable to:
set an overvoltage limit for the power supply circuit to a first value that is higher than a safety limit defined for the power supply circuit;
detect that an output voltage of the power supply circuit reaches the overvoltage limit;
in response to detecting that the output voltage reaches the overvoltage limit, change the overvoltage limit to a second value that is lower than the safety limit and deactivate the power supply circuit;
subsequently reactivate the power supply circuit;
determine whether the output voltage of the power supply circuit reaches the second value of the overvoltage limit after each occurrence of reactivation of the power supply circuit; and
deactivate the power supply circuit for each occurrence of the output voltage reaching the second value.

15. The power supply circuit of claim 14 wherein the overvoltage protection circuit is further operable to wait for a first predetermined time period after deactivating the power supply circuit before reactivating the power supply circuit.

16. The power supply circuit of claim 14, wherein the overvoltage protection circuit is further operable to change the overvoltage limit from the second value back to the first value in response to a determination that the output voltage has remained below the second value for a second predetermined time period after reactivating the power supply circuit.

17. The power supply circuit of claim 14 further comprising a bleeder circuit configured to discharge the output voltage of the power supply during periods when the power supply circuit is deactivated.

18. The power supply circuit of claim 14 further comprising a switch, wherein the switch input is driven by a pulse-width modulated (PWM) signal output from the controller in order to control the voltage output from the power supply circuit.

19. The power supply circuit of claim 14, wherein the load is a light-emitting diode (LED) or a string of LEDs.

20. The power supply circuit of claim 14 further comprising an isolation circuit configured to isolate a voltage generated at an input of the isolation circuit from an output voltage provided to a load that is attached to the power supply circuit.

* * * * *